(12) United States Patent
Park et al.

(10) Patent No.: US 6,469,814 B1
(45) Date of Patent: Oct. 22, 2002

(54) APPARATUS AND METHOD FOR DETECTING CHANNEL INFORMATION FROM WDM OPTICAL SIGNAL BY USING WAVELENGTH SELECTIVE PHOTO DETECTOR

(75) Inventors: Chang Soo Park, Taejon (KR); Wan Seok Seo, Taejon (KR); Byung Ho Yun, Seoul (KR)

(73) Assignees: Electronics and Telecommunications Research Institute (KR); Korea Telecom (KR)

( * ) Notice: Subject to any disclaimer, the term of this patent is extended or adjusted under 35 U.S.C. 154(b) by 0 days.

(21) Appl. No.: 09/429,261

(22) Filed: Oct. 29, 1999

(30) Foreign Application Priority Data

Nov. 9, 1998 (KR) .............................. 98-47791

(51) Int. Cl.[7] ................................ H04J 14/02
(52) U.S. Cl. ...................... 359/124; 359/110; 359/133; 359/188; 359/161; 359/341
(58) Field of Search ...................... 359/110, 124–134, 359/174–179, 173, 161, 341, 337, 154, 187, 188

(56) References Cited

U.S. PATENT DOCUMENTS

| | | | |
|---|---|---|---|
| 4,581,730 A | * 4/1986 | Ozeki et al. ................... 370/2 |
| 5,432,629 A | * 7/1995 | Shikada et al. .............. 359/124 |
| 5,617,234 A | 4/1997 | Koga | |
| 5,760,419 A | 6/1998 | Nabiev | |
| 5,796,479 A | 8/1998 | Derickson | |
| 5,894,362 A | * 4/1999 | Onaka et al. ................ 359/124 |
| 6,335,810 B1 | * 1/2002 | Uehara ......................... 359/127 |
| 6,347,169 B1 | * 2/2002 | Kang et al. .................... 385/24 |
| 6,384,947 B1 | * 5/2002 | Ackerman et al. .......... 359/187 |

OTHER PUBLICATIONS

Active Wavelength Measurement System Using an InGaAs–InP quantum Well Electroabsorption Filtering Detector; by T. Coroy et al. vol. 8, No. 12.

* cited by examiner

Primary Examiner—Leslie Pascal
Assistant Examiner—Hanh Phan
(74) Attorney, Agent, or Firm—Blakely Sokoloff Taylor & Zafman

(57) ABSTRACT

An apparatus and a method for detecting channel information from wavelength division multiplexed (WDM) optical signals by using a wavelength selective photo detector. This apparatus and method can monitor channel status in a simple, rapid and economical way. The apparatus includes: pre-processor for pre-processing WDM optical signals and outputting a portion of the WDM optical signals; a photo detector for converting the WDM optical signal from said pre-processor a first electrical signal having a constant value regardless of wavelengths of the WDM optical signal; a wavelength selective photo detector for converting the WDM optical signal from said pre-processor into a second electrical signal having a different value in response to the wavelength of the distributed optical signal; lookup table; normalization part for normalizing the second electrical signal with respect to the first electrical signal; channel number detector for detecting a number of channels using the electrical power for one channel and power of the first electrical signal; and channel location detector for detecting channel location by using normalized electrical signals and electrical power values stored in said lookup table.

10 Claims, 7 Drawing Sheets

APPARATUS AND METHOD FOR DETECTING CHANNEL INFORMATION FROM WDM OPTICAL SIGNAL BY USING WAVELENGTH SELECTIVE PHOTO DETECTOR

BACKGROUND OF THE INVENTION

1. Field of the Invention

The present invention relates to an apparatus and a method for detecting channel information; and, more particularly, the present invention relates to an apparatus and a method for monitoring channel status and detecting location and a number of working channels from a wavelength division multiplexed (WDM) signal without demultiplexing the WDM signals by using a wavelength selective detector (herein, in the WDM signal, a wavelength means a channel).

2. Description of the Prior Art

A status of an individual channel is an important factor in terms of management, maintenance and monitoring performance of network. Switching and recovering operations should be rapidly performed in accordance with a channel status when there is an error in optical network, since a lot of information are transmitted through transmission channel at a high speed (e.g., 10 Gbps or more than 10 Gbps). Thus, the status information for each channel should be monitored rapidly, correctly, simply, and in an economical way.

In a wavelength division multiplexed optical transmission system and an optical transport network, presence of individual channel cannot be identified without demultiplexing the wavelength division multiplexed signal, since lots of channels, each channel having a different wavelength, are transmitted as mixed.

FIG. 1 is a diagram illustrating a WDM channel detector in accordance with a conventional method. The WDM channel detector comprises an optical multiplexer 11, an optical amplifier 12, an optical coupler 13, an optical demultiplexer 14, a photo detector 15 and a signal processor 16.

Optical signals, each of which has a different wavelength, are multiplexed by the optical multiplexer 11. The multiplexed optical signals are divided into individual channel at the optical demultiplexer 14. Thereafter, it is determined that the channel is presented or not on the basis of the divided signals. Thus, there existed disadvantages that lots of optical elements, such as the optical demultiplexer 14 and the photo detectors 15 (D1 to Dn), are needed, thereby additional loss of optical power resulted from use of the demultiplexer 14 is caused. Such a conventional WDM channel detector is described in U.S. Pat. No. 5,617,234 issued to M. Koga, entitled of "Multiwavelength simultaneous monitoring circuit employing arrayed-waveguide grating".

FIG. 2 is a diagram illustrating another conventional WDM channel detector. The WDM detector comprises an optical multiplexer 21, an optical amplifier 22, an optical coupler 23, a variable optical filter 24, a waveform counter 25 and an optical detector 27.

The waveform counter 25 detects presence and location of working channels from wavelength division multiplexed optical signals scanned through a tunable optical filter 24 and optical-to-electrical converted through a photo detector 27. An article by C. Konishi, "Dynamic gain controlled erbium doped fiber amplifier repeater for WDM network", OFC'97 Paper TuE1, pp18–19, 1997, shows an example of method for checking the presence of channel by using the tunable optical filter 24 without demultiplexing the WDM signals such as shown in FIG. 2. Even though the optical demultiplexer 14 is not used in Konishi's method contrary to the above mentioned U.S. Pat. No. 5,617,234, there are demerits that the tunable optical filter 24 such as an expensive Acousto Optic Tunable Filter(AOTF) is necessarily needed, and that a detection speed is restricted due to scanning of the tunable optical filter 24. Moreover, there is a disadvantage in Konishi's method that processing of signal in a tunable optical filter controller 26 and a waveform counter 25 is relatively complicated.

SUMMARY OF INVENTION

Therefore, it is an object of the present invention to provide an apparatus and a method for detecting channel information from wavelength division multiplexed signals without demultiplexing the wavelength division multiplexed signals.

It is another object of the present invention to provide an apparatus and a method for detecting channel information from wavelength division multiplexed signals without using complicated and expensive devices.

It is still another object of the present invention to provide an apparatus and a method for more rapidly detecting channel information from wavelength division multiplexed signals without delay due to scanning.

In accordance with one embodiment of the present invention, there is provided an apparatus for detecting channel information in each channel from wavelength division multiplexed (WDM) optical signals each having a different wavelength, comprising: a pre-processor for pre-processing WDM optical signals and outputting a portion of the WDM optical signals; a photo detector for converting the WDM optical signal from said pre-processor into a first electrical signal having a constant value regardless of wavelengths of the WDM optical signal; a wavelength selective photo detector for converting the WDM optical signal from said pre-processor into a second electrical signal having a different value in response to the wavelength of the distributed optical signal; a lookup table for storing the wavelengths, a number of channels and optical power per channel; normalization part for normalizing the second electrical signal with respect to the first electrical signal; channel number detector for detecting a number of channels using the optical power per channel and power of the first electrical signal; and channel location detector for detecting channel locations by using normalized electrical signals and electrical power values stored in said lookup table.

In accordance with another embodiment of the present invention, there is provided a method for detecting channel information from wavelength division multiplexed optical signals each having a different wavelength, comprising the steps of: a) storing wavelengths to be used as channnls, a number of channel, an optical power per a channel and electrical power values, each of the electrical power value corresponding to a channel combination specifying location of working channel in a lookup table; b) pre-processing WDM optical signals and outputting a portion of the WDM optical signals; c) converting pre-processed WDM optical signal into a first electrical signal having a constant value regardless of wavelengths of the WDM optical signal; d) converting the pre-processed WDM optical signal into a second electrical signal having a different value in response to the wavelength of the WDM optical signal; e) normalizing the second electrical signal with respect to the first electrical signal; f) detecting a number of channels using the optical power per channel and power of the first electrical signal;

and g) detecting channel location by using normalized electrical signals and electrical power values stored in the lookup table.

In accordance with still another embodiment of the present invention, there is provided a computer-readable recording medium, tangibly embodying a program of instruction executable by the machine to perform a method for detecting channel information from wavelength division multiplexed signals each having a different wavelength, said programs of the instruction running in a data processing machine, the method comprising the steps of: a) storing wavelengths to be used as channels, a number of channel, electrical power values for one channel (almost all the same) and each electrical power corresponding to a channel combination specifying location of working channel in a lookup table; b) pre-processing WDM optical signals and outputting a portion of the WDM optical signals; c) converting the WDM optical signal pre-processed into a first electrical signal having a constant value regardless of wavelengths of the WDM optical signal; d) converting the WDM optical signal pre-processed into a second electrical signal having a different value in response to the wavelength of the WDM optical signal; e) normalizing the second electrical signal with respect to the first electrical signal; f) detecting a number of channels using the electrical power corresponding to one channel and power of the first electrical signal; and g) detecting channel location by using normalized electrical signals and electrical power values stored in the lookup table.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

A preferred embodiment of the present invention will be explained in detail in reference to the attached drawings.

Figure 1:
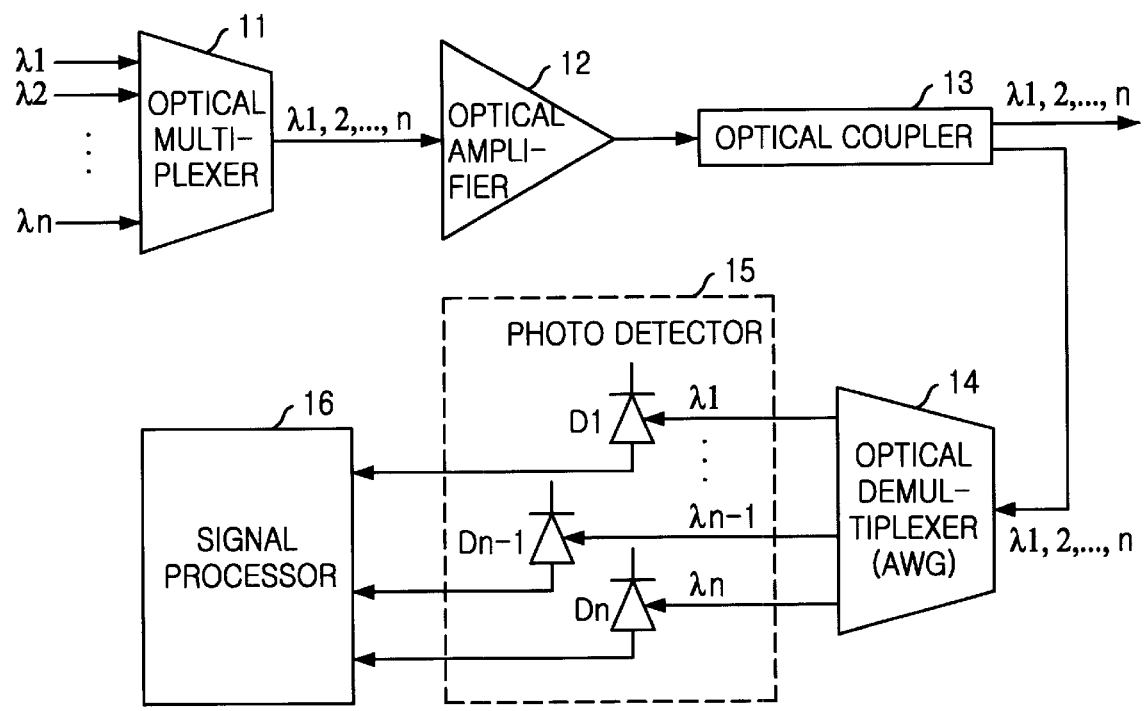
FIG. 1 is a block diagram illustrating a conventional WDM channel detector.
Figure 2:
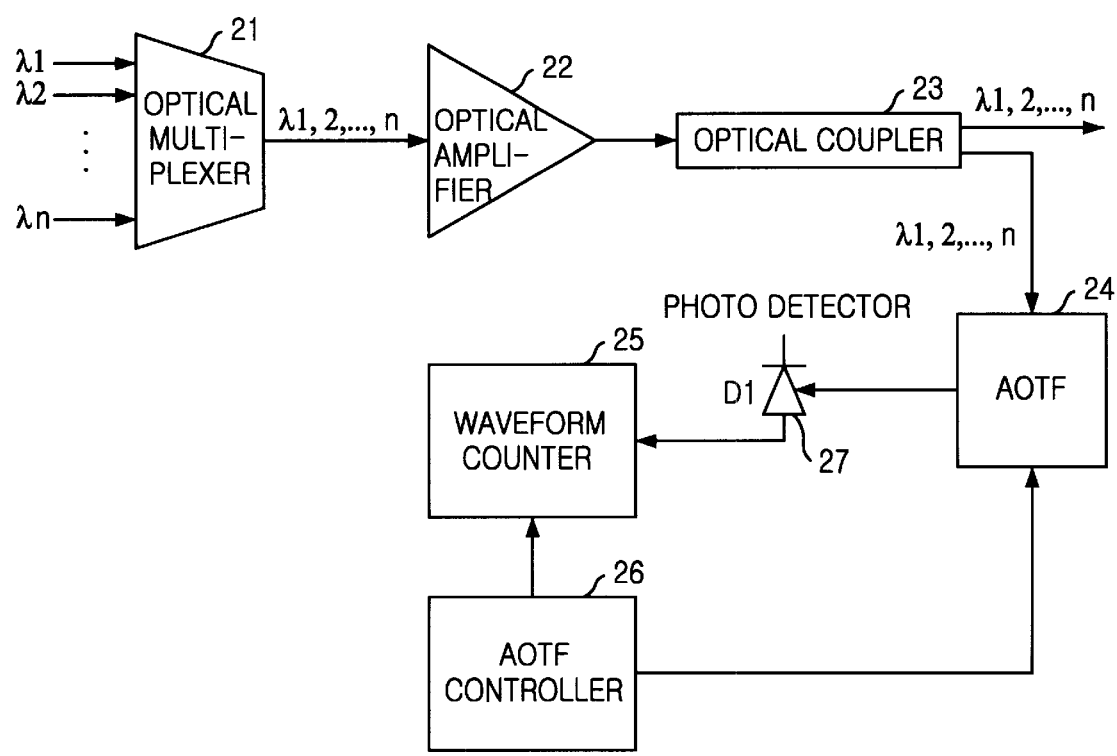
FIG. 2 is a block diagram showing another conventional WDM channel detector.
Figure 3:
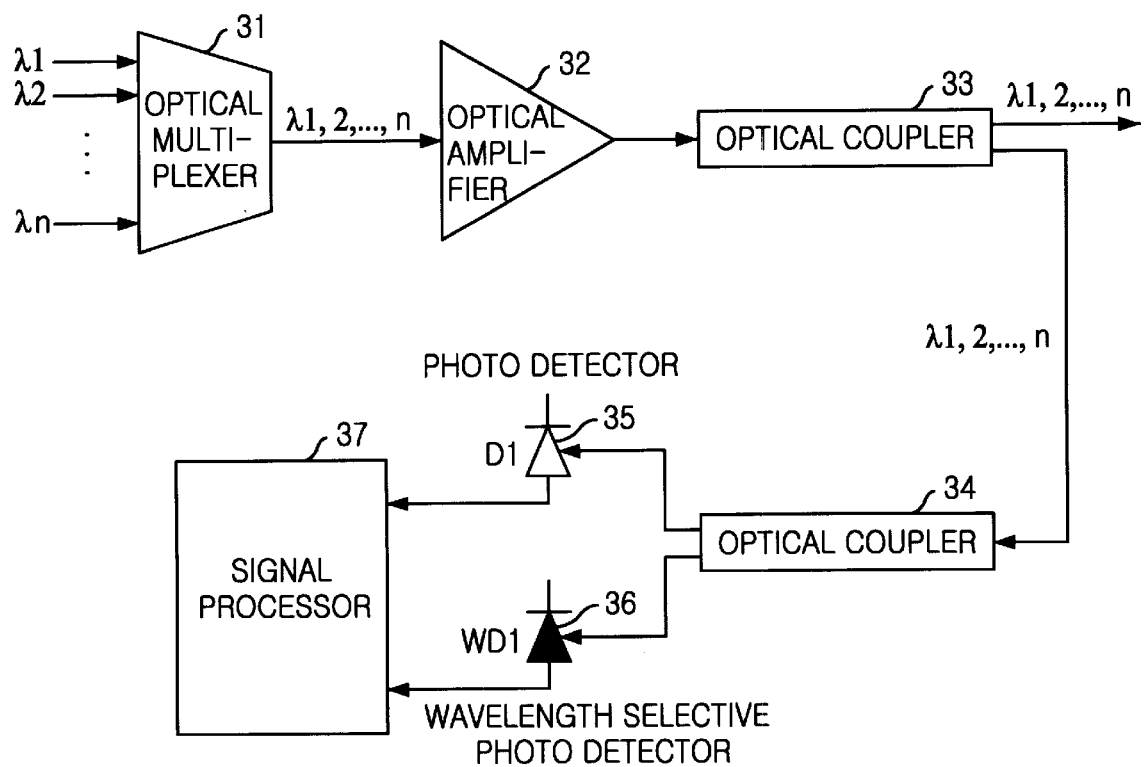
FIG. 3 is a block diagram describing a WDM channel detector in accordance with the present invention.

FIG. 3 is a block diagram describing wavelength division multiplexed (WDM) channel detector.

The WDM channel detector in accordance with the present invention detects the operation status, locations and numbers of wavelength division multiplexed optical signals by using a wavelength selective photo detector and a normal photo detector.

The WDM channel detector comprises an optical multiplexer 31, an optical amplifier 32, optical couplers 33 and 34, a photo detector 35, a wavelength selective photo detector and a signal processor 37.

The optical multiplexer 31 multiplexes input optical signals, each of which has a different wavelength. The optical amplifier 32 amplifies the optical signal multiplexed at the optical multiplexer 31. The optical coupler 33 divides the multiplexed optical signal amplified at the optical amplifier 32. A part of the optical signals divided at the optical coupler 33 is fed into the optical coupler 34 as a monitor signal. The optical coupler 34 distributes the optical signals from the optical coupler 33 into the photo detector 35 and a wavelength selective photo detector 36. The normal photo detector 35 converts the optical signals from the optical coupler 34 to electrical signals having a constant value regardless of the wavelengths of the optical signals. The wavelength selective photo detector 36 converts the optical signals from the optical coupler 34 to electrical signals each having a different value in response to the wavelength of the optical signals. The signal processor 37 detects the operation status, the location and the number of channels by using the electrical signals from the photo detector 35 and the wavelength selective photo detector 36.

Herein, utilizing a wavelength selective photo detector suggested in an article by T. Coroy, "Active wavelength measurement system using an InGaAs-Inp quantum well electro absorption filtering detector," *IEEE Photonics Technology Letter,* pp.1686–1688, August, 1996, a wavelength of an input optical signal can simply and economically be measured, thus the presence of channels can be detected by using an apparatus and method in accordance with the present invention together therewith.

Channel status of each of the WDM optical signals can be represented by binary codes. For example, considering two wavelength division multiplexed system, it can be assumed that "1" indicates presence of working channel and "0" means absence of working channel. Thus, "00" indicates that both channels are not working channels, "01" or "10" that only one of two channels is a working channel, and "11" that both channels are working channels. The status "01" and "10" indicate that only one of two channels is working and location of the working channel is different.

Also, the binary codes indicating the channel status can be represented by decimal codes. The binary codes "00", "01", "10" and "11" can respectively be represented by "0", "1", "2" and "3".

As explained above, there is a difference in electrical power value responsive to the location of the working channel. Thus, the WDM channel detector in accordance with the present invention detects the number and the location of non-working channel by using nonlinear characteristics of a wavelength selective photo detector.

Figure 4:
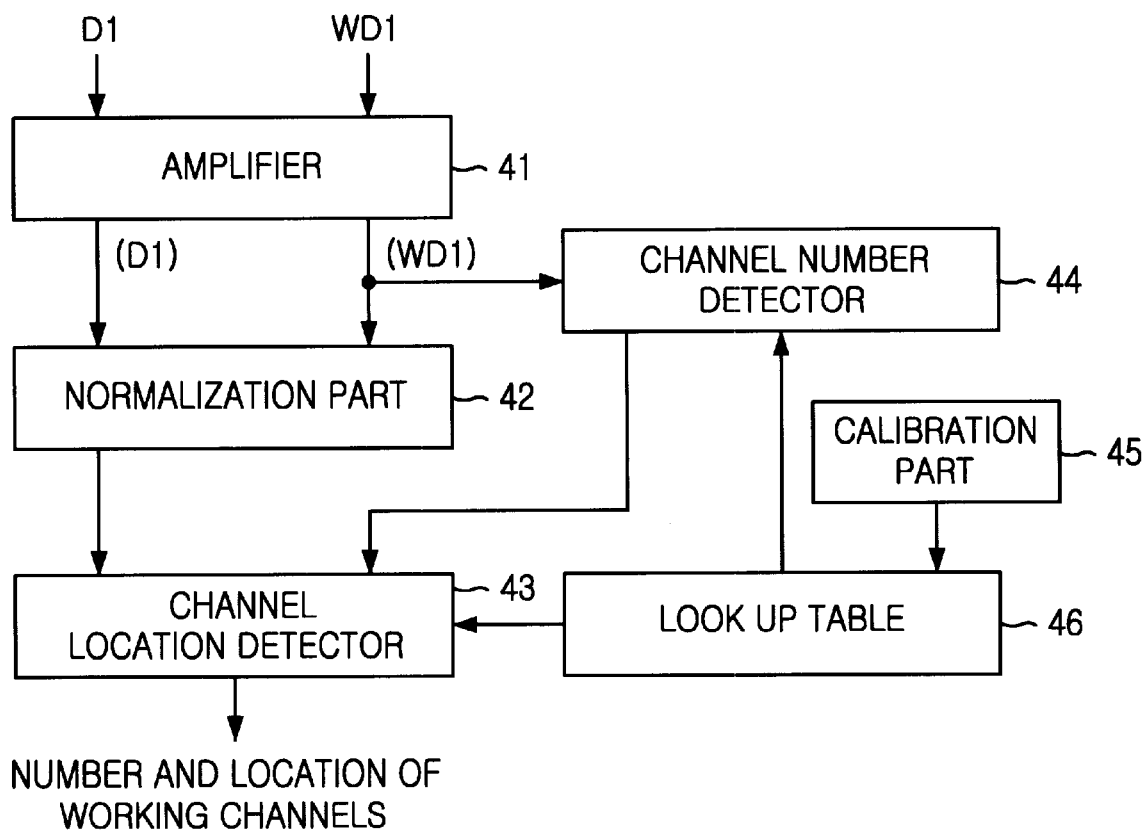
FIG. 4 is a detailed block diagram depicting a signal processor of FIG. 3 in accordance with the present invention.

FIG. 4 is a detailed block diagram illustrating a signal processor of FIG. 3 in accordance with the present invention. The signal processor 37 comprises an amplifier 41, a normalizing part 42, a channel location detector 43, a channel number detector 44, a correcting part 45 and a lookup table 46.

The amplifier 41 amplifies electrical signals D1 and WD1 from the photo detector 35 and the wavelength selective photo detector 36 in FIG. 3. The channel number detector 44 divides the electrical signals outputted from the photo detector 35 by a pre-measured electrical output for one channel, and compares dividing results with values stored in the lookup table 46 to thereby obtains a number of channels.

The lookup table 46 includes wavelengths to be used, the number of channels and an electrical output value for one channel. The calibration part 45 performs a calibration for initial vales in the lookup table such as the used wavelengths, the number of channels and electrical output value for one channel when establishing a WDM channel detecting system.

The normalization part 42 normalizes amplified signals from the amplifier 41.

Since normalized output values from the wavelength selective photo detector 36 are different from each other in accordance with the location of the channel, the channel location detector 43 detects the location of the channel by comparing the normalized result from the normalization part 42 with electrical power values stored in the lookup table 46. In other words, the channel location detector 43 receives the number of channels and the normalized result from the channel number detector 44 and the normalization part 42. The channel location detector 43 compares the normalized result with the electrical power values stored in the lookup table 46 and finds the location of the channel. Signal power values, which correspond to the number and the location of the channel, were stored in the lookup table 46. Therefore, the channel location detector 43 finds the location of the channel by comparing the normalized result with the location values stored in the lookup table 46.

For example, when only two channels are presented in an optical system using three channels (wavelengths), channel combination can be expressed as one of three sets (0, 1, 1), (1, 0, 1) or (1, 1, 0). Normalized signal powers are different from each other in response to the channel combination. Therefore, the channel location detector 43 compares the normalized signal power with the reference value stored in the lookup table 46 and then detects the channel combination corresponding to the normalized signal power.

Figure 5:
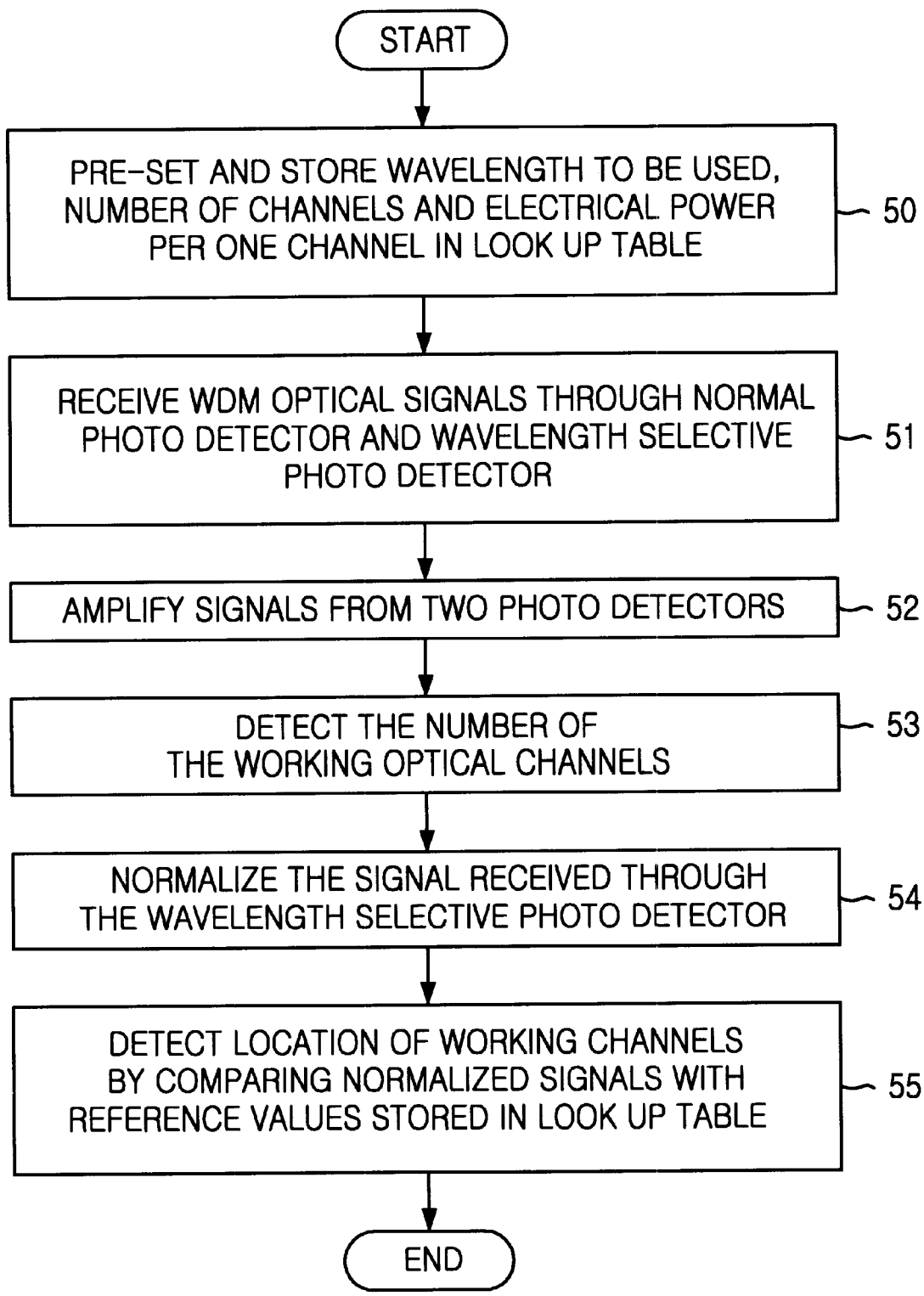
FIG. 5 is a flow chart offering a method for detecting channel information from the wavelength division multiplexed optical signals by using the wavelength selective photo detector in accordance with the present invention.

FIG. 5 is a flowchart illustrating a method for detecting the operation status, the location and the number of channels from the wavelength division multiplexed optical signal in accordance with one embodiment of the present invention.

First, wavelengths to be used, a number of channels and electrical power values for each channel (but almost all the same) are pre-set and stored in a lookup table at step 50. Then, the process receives the wavelength division multiplexed (WDM) optical signal through a normal photo detector and a wavelength selective photo detector at step 51. The normal photo detector outputs a constant value regardless of wavelength of the WDM optical signal. The wavelength selective photo detector outputs a different value in response to the wavelength of the WDM optical signal.

The process amplifies the signals received from the normal photo detector and the wavelength selective photo detector at step 52, and detects the number of working optical channels by dividing the signal received through the normal photo detector by the electrical signal power corresponding to one channel and by comparing dividing result with the electrical power values in the lookup table at step 53.

The process normalizes the signal received through the wavelength selective photo detector with respect to the signal received through the normal photo detector at step 54, and then detects location of the working channels by comparing the normalized result and the number of the channels with reference values stored in the look up table at step 55.

Figure 6:
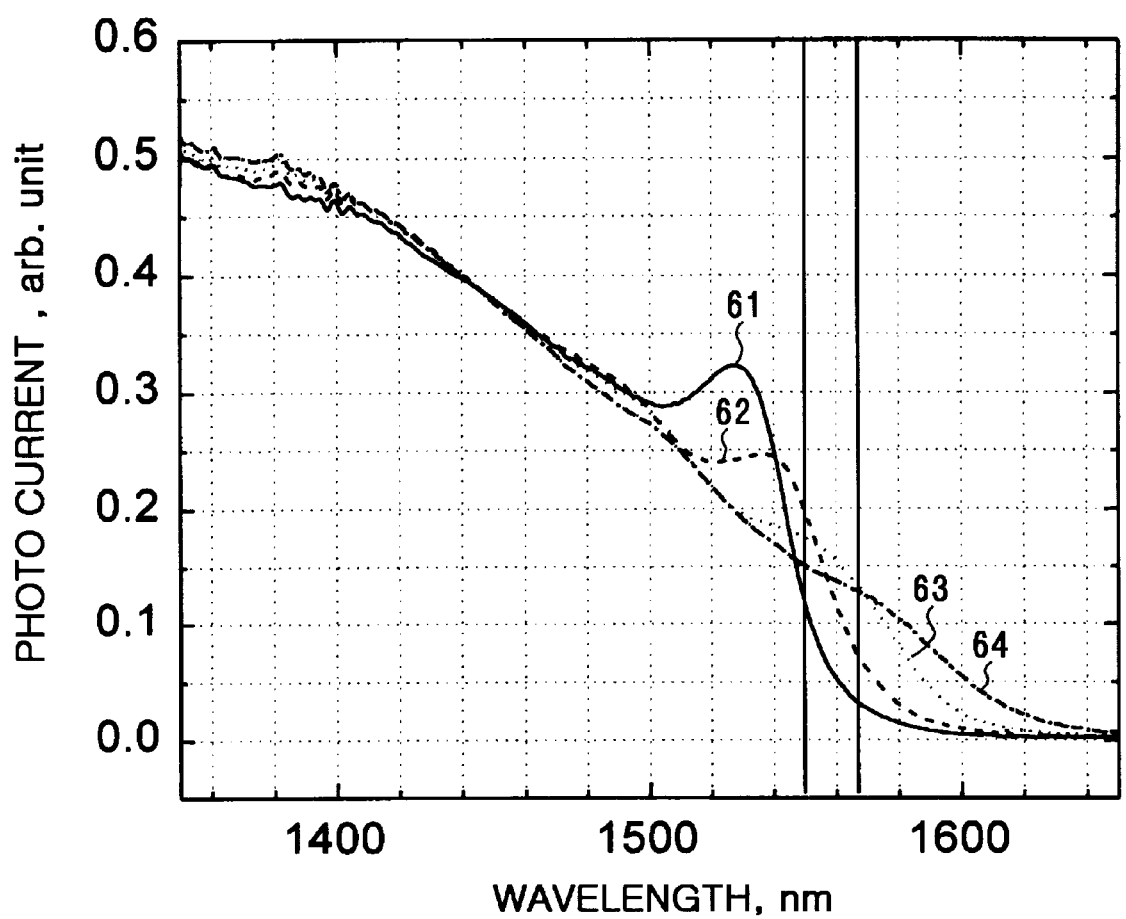
FIG. 6 is a graph demonstrating wavelength response characteristics of the wavelength selective photo detector utilized at the present invention.

FIG. 6 is a response characteristic curves of the wavelength selective photo detector measured at several bias levels as varying reverse-biased voltage of the wavelength selective photo detector.

In the present invention, band of which wavelength-to-electrical current response is nonlinear is used. In FIG. 6, reference numeral 61 denotes the wavelength-to-the electrical current response characteristic curve when a reverse-bias voltage is 0.0 volt, and 62, 63 and 64 respectively denote when reverse-bias voltages are 0.5, 1.0 and 1.5 volts.

Figure 7A:
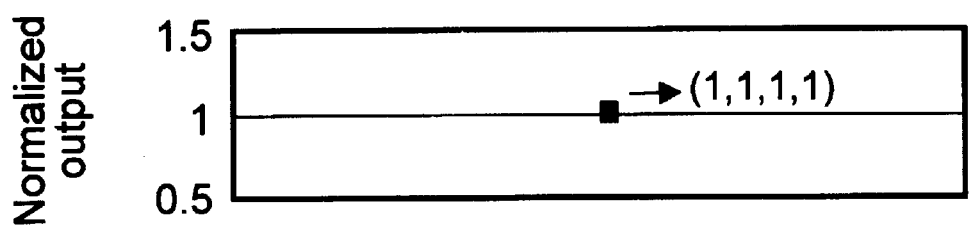
FIGS. 7a through 7d are graphs disclosing a normalized output in response to operation of an input channel in case of four channel input in the present invention.
Figure 7B:
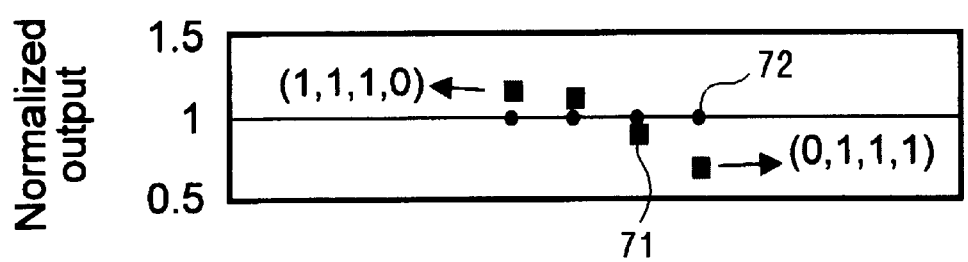
Figure 7C:
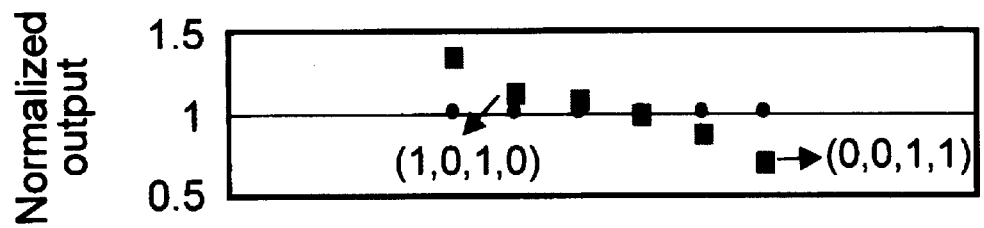
Figure 7D:
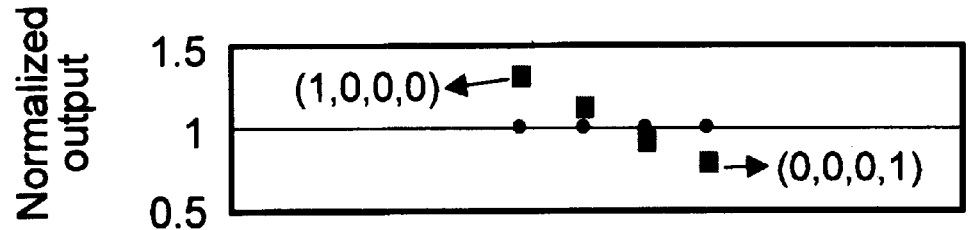

FIGS. 7*a* through 7*d* are graphs illustrating normalized outputs of four input channels in accordance with one experiment of the present invention. In FIG. 7*b*, the reference numeral 71 (described by using the square) denotes the normalized outputs of the wavelength selective photo detector, and 72 (denoted by using the circle) does outputs of the normal photo detector.

Referring again to FIGS. 3 and 4, in this experiment, four input channels (wavelengths) λ1 to λ4, 1554.12, 1555.77, 1557.40, 1558.99 nm are used. After four signals each having wavelengths λ1 to λ4 are multiplexed through the multiplexer 31 and divided by the optical coupler 33, a portion of the optical power are distributed by the optical coupler 34 to the normal photo detector 35 and the wavelength selective photo detector 36.

Two electrical signals from two photo detectors 35 and 36 are normalized by the normalization part 42. Outputs of the normalization part 42 are illustrated in FIGS. 7*a* through 7*d*. The outputs are classified into four groups as shown in FIGS. 7*a* through 7*d*. FIGS. 7*a*, 7*b*, 7*c* and 7*d* respectively illustrate normalized result when working channel(s) is (are) 1, 2, 3 and 4.

The normalized results are different in response to the location of the working channels. Therefore, using the normalized results, the location of the working channels can be detected.

Since the WDM channel detector in accordance with the present invention uses less optical elements and no AOTF (Acousto Optic Tunable Filter), the WDM channel detector can rapidly and economically detect channel information without demultiplexing the WDM signals.

The WDM channel detector in accordance with the present invention can monitor status of optical channels as installed at one terminal of WDM optical transmission system. Also, the WDM channel detector can be used as an optical signal monitor in the optical cross-connect system.

Also, the WDM channel detector in accordance with the present invention can be utilized as a channel gain stabilization circuit of an optical fiber amplifier in the WDM optical transmission system.

While the present invention has been described with respect to certain preferred embodiments only, other modification and variations may be made without departing from the spirit and scope of the present invention as set forth in the following claims.

What is claimed is:

1. An apparatus for detecting channel information in each channel from wavelength division multiplexed (WDM) optical signals each having a different wavelength, comprising:

a pre-processor for pre-processing WDM optical signals and outputting a portion of the WDM optical signals;

a first converter for converting pre-processed WDM optical signal into a first electrical signal having a constant value regardless of wavelengths of the WDM optical signal;

a second converter for converting the pre-processed WDM optical signal into a second electrical signal having a different value in response to the wavelength of the distributed optical signal;

a lookup table storing wavelengths to be used, a number of channels and an electrical signal power for one channel;

means for normalizing the second electrical signal with respect to the first electrical signal;

a channel number detector for detecting a number of channels using the electrical signal power for one channel and power of the first electrical signal; and a channel location detector for detecting channel location by using normalized electrical signal from said second conversion means and electrical power values stored in said lookup table.

2. The apparatus of claim 1, further comprising means for amplifying the first electrical signal and the second electrical signal from said first and said second conversion means.

3. The apparatus of claim 1, wherein said channel location detector comprises:

means for comparing the normalized electrical signal with electrical power values stored in said lookup table, the electrical power value corresponding to a set of channel combination specifying location of the working channels; and means for outputting the set of channel combination if a power value of the normalized electrical signal is the same as the electrical power value stored in said lookup table.

4. The apparatus of claim 1, wherein said second converter comprises a wavelength selective photo detector.

5. The apparatus of claim 4, wherein said first converter comprises a photo detector.

6. The apparatus of claim 4, wherein said pre-processor comprises:

means for multiplexing optical signals having a different wavelength;

means for amplifying multiplexed optical signal; and means for dividing amplified optical signals and outputting a portion of the amplified optical signals; and means for distributing the portion of the amplified optical signals to said first and said second converter.

7. The apparatus of claim 4, wherein said pre-processor comprises:

means for amplifying wavelength division multiplexed optical signals; and means for dividing amplified optical signals and outputting a portion of the amplified optical signals; and means for distributing the portion of the amplified optical signals to said first and said second converter.

8. A method for detecting channel information from wavelength division multiplexed optical signals each having a different wavelength, comprising the steps of:

a) storing wavelengths to be used as channels, a number of channel, an electrical power value for one channel and electrical power values, each of the electrical power value corresponding to a channel combination specifying location of working channel in a lookup table;

b) pre-processing WDM optical signals and outputting a portion of the WDM optical signals;

c) converting pre-processed WDM optical signal into a first electrical signal having a constant value regardless of wavelengths of the WDM optical signal;

d) converting the pre-processed WDM optical signal into a second electrical signal having a different value in response to the wavelength of the WDM optical signal;

e) normalizing the second electrical signal with respect to the first electrical signal;

f) detecting a number of channels using the electrical power corresponding to one channel and power of the first electrical signal; and g) detecting channel location by using normalized electrical signals and electrical power values stored in the lookup table.

9. The method of claim 8, wherein said step g) detecting channel location comprises the steps of:

comparing the normalized electrical signal with electrical power values stored in the lookup table, the electrical power value corresponding to sets of channel combination specifying location of the working channels; and outputting the set of channel combination if a power of the normalized electrical signal is the same as the electrical power value.

10. A computer-readable recording medium, tangibly embodying a program of instruction executable by the machine to perform a method for detecting channel information from wavelength division multiplexed signals each having a different wavelength, said programs of the instruction running in a data processing machine, the method comprising the steps of:

a) storing wavelengths to be used. as channels, a number of channel, electrical power values for one channel (almost all the same) and each electrical power corresponding to a channel combination specifying location of working channel in a lookup table;

b) pre-processing WDM optical signals and outputting a portion of the WDM optical signals;

c) converting the WDM optical signal pre-processed into a first electrical signal having a constant value regardless of wavelengths of the WDM optical signal;

d) converting the WDM optical signal pre-processed into a second electrical signal having a different value in response to the wavelength of the WDM optical signal;

e) normalizing the second electrical signal with respect to the first electrical signal;

f) detecting a number of channels using the electrical power corresponding to one channel and power of the first electrical signal; and g) detecting channel location by using normalized electrical signals and electrical power values stored in the lookup table.

* * * * *